United States Patent [19]

Shaw et al.

[11] Patent Number: 4,546,476
[45] Date of Patent: Oct. 8, 1985

[54] FIBER OPTIC AMPLIFIER

[75] Inventors: Herbert J. Shaw; Marvin Chodorow, both of Stanford,, Calif.

[73] Assignee: The Board of Trustees of The Leland Stanford Junior University, Stanford, Calif.

[21] Appl. No.: 448,707

[22] Filed: Dec. 10, 1982

[51] Int. Cl.[4] .............................................. H01S 3/30
[52] U.S. Cl. .................... 372/6; 350/96.15; 372/69
[58] Field of Search ............... 378/6, 69–72, 378/66; 350/96.15

[56] References Cited

U.S. PATENT DOCUMENTS

| | | | |
|---|---|---|---|
| 3,456,299 | 7/1969 | Koester | 378/6 |
| 3,779,628 | 12/1973 | Kapron et al. | 350/96.15 |
| 4,136,929 | 1/1979 | Suzaki | 372/6 |

Primary Examiner—William L. Sikes
Assistant Examiner—Léon Scott, Jr.
Attorney, Agent, or Firm—Knobbe, Martens, Olson & Bear

[57] ABSTRACT

A pair of small diameter optical fibers are arranged in a side-by-side configuration, the first fiber providing a pumping source, and the second fiber doped with a material which will lase at the signal frequency. The signal to be amplified propagates through the second fiber to stimulate emission of coherent light from the lasing material, resulting in amplification of the signal. The refractive index of the first and second fibers are selected such that the signal in the second fiber is well guided, while the pumping light in the first fiber is unguided, yielding low losses in the second fiber but high transfer of the pumping light from the first fiber to the second fiber.

30 Claims, 8 Drawing Figures

U.S. Patent   Oct. 8, 1985   Sheet 1 of 2   4,546,476
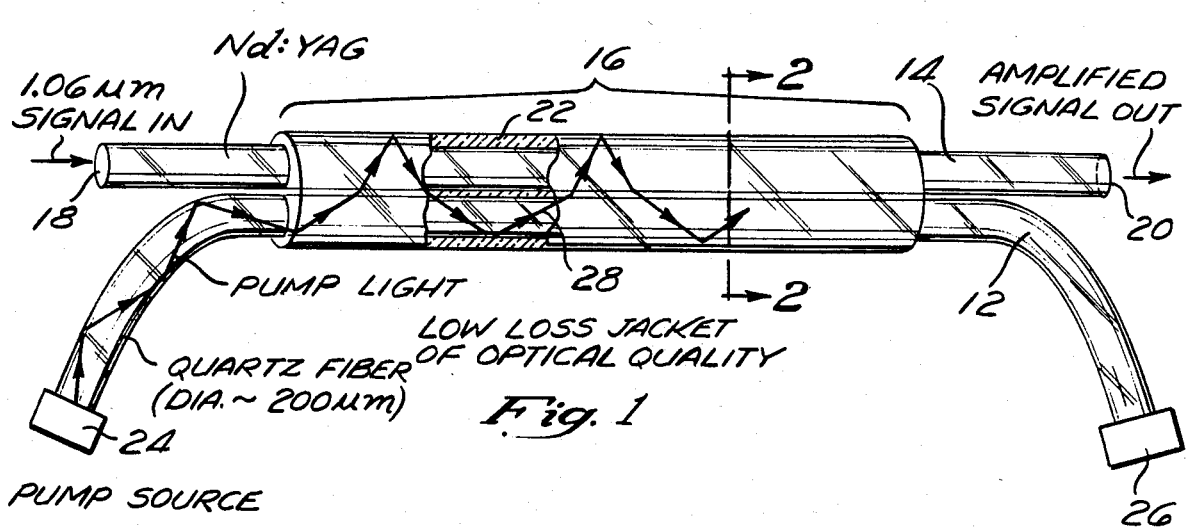
Fig. 1
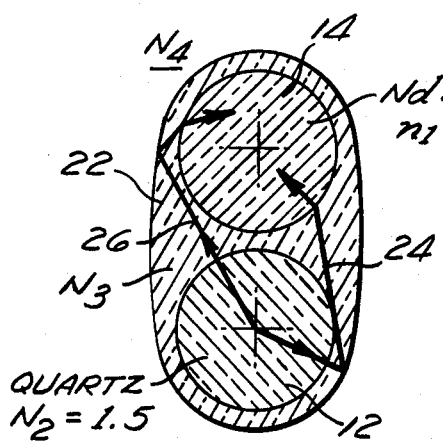
Fig. 2
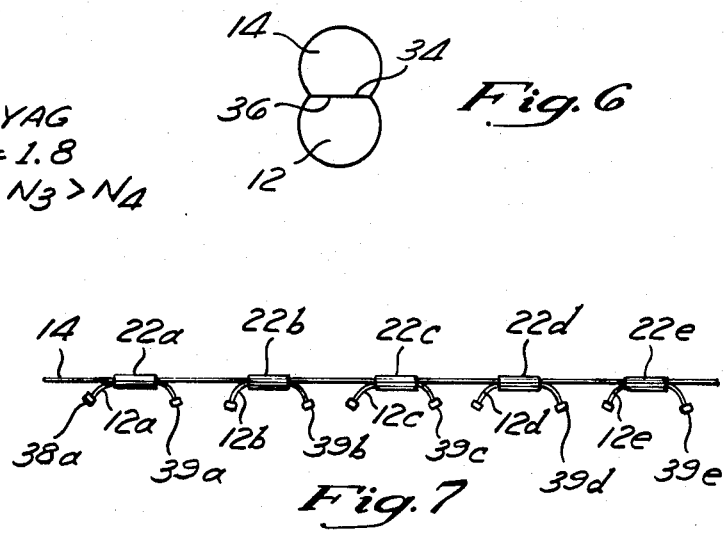
Fig. 6
Fig. 7
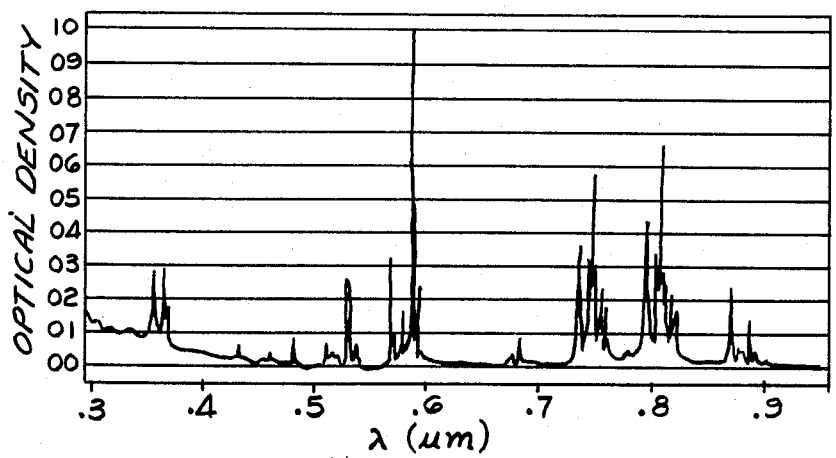
Fig. 3

FIBER OPTIC AMPLIFIER

BACKGROUND OF THE INVENTION

The present invention relates to fiber optic amplifiers. The Government has rights in this invention pursuant to contracts F49620-80-C-0040 and F33615-79-C-1789 awarded by the United States Air Force, Air Force Office of Scientific Research.

The concept of optical amplifiers, based upon the lasing capability of certain materials, particularly on a macroscopic level, is well known. Thus, for example, it is known to place a pumping light source and a single crystal neodymium-ytrium aluminum garnet (ND:YAG) rod, several millimeters in diameter and several centimeters in length, in a tubular reflective cavity. For example, the light source and ND:YAG rod may be located, respectively, to extend along the two foci of a cavity having an elliptical cross section. In such an arrangement, light emitted by the light source and reflected from the cavity walls will impinge upon the ND:YAG rod. The light source is preferably selected to emit wavelengths corresponding to the absorption spectra of the ND:YAG crystal so that the energy states of the neodymium ions of the crystal are inverted to an energy level above the upper lasing level. After inversion, an initial relaxation of the neodymium ions through phonon radiation yields an ion population at the upper lasing level. From the upper lasing level, the ions will lase, to a lower energy level, emitting light of a wavelength which is characteristic of the ND:YAG material. Advantageously, this lower energy level is above the ground level for the ions so that a rapid, phononemitting relaxation will occur between this lower energy level and the ground level, enabling a high inversion ratio to continue to exist between the upper lasing level and this lower energy level, within the pumped ions.

With the population so inverted, as is well known from laser technology, the ND:YAG will also provide a very slow fluorescence, that is, random emission of incoherent light. This spontaneous radition, however, has a minimal affect on the amplifying rod, since the average lifetime of ions in the inverted state is 230 microseconds.

If, after the neodymium ions of the ND:YAG rod have been inverted, a light signal at the lasing frequency is transmitted through the rod, the light signal will trigger the lasing transition of the neodymium ions, causing coherent emission of stimulated radiation, which will effectively add to the transmitted signal, thus amplifying this signal.

The absorption length of the pumping illumination within the ND:YAG crystal (i.e., the length of material through which the illumination must traverse before 60% of the illumination is absorbed) is typically in the range between 2 and 3 millimeters, and thus the ND:YAG crystals used in amplifying structures have had diameters at least this large so that the crystal could absorb a substantial portion of the pumping radiation during the initial reflection from the cavity walls and passage through the crystal. If, during this initial traverse through the crystal, the pumping illumination is not absorbed, it is likely to be reflected by the cavity walls back to the light source, where it will be reabsorbed, generating heat in the light source and reducing the overall efficiency of the amplifier.

When such amplifiers are used in fiber optic systems, it has been thought necessary to use optical components, such as lenses, to focus light from the optical fiber into the ND:YAG rod, and the amplified light signal from the ND:YAG rod back into another fiber. Such optical systems require careful alignment and are susceptible to environmental changes, such as vibration, and thermal effects. Additionally, the optical components and the size of the ND:YAG rod make the amplifying system relatively large, and thus impractical for certain applications. Furthermore, the relatively large size of the ND:YAG rod introduces beam wander within the rod. Thus, the signal from the input fiber optic element will traverse different paths through the rod, a characteristic which is temperature related and varies with time, so that the output light may be lost due to the fact that the output fiber will accept only light within a small acceptance angle. Thus, as the beam within the ND:YAG rod wanders, the output signal may vary in an uncontrollable manner. Furthermore, the large size of the ND:YAG rod requires a large amount of input energy in order to maintain a high energy density within the rod. Such large pump power requires high output pump light sources, generating substantial heat which must be dissipated, typically by liquid cooling of the cavity.

While amplifiers of this type are useful in many applications, such as some communications applications, use in a recirculating fiber optic gyroscope puts severe restrictions upon the amplification system. With such gyroscopes, optical fiber, typically a kilometer or more in length, is wound into a loop, and a light signal is recirculated within the loop, typically in both directions. Motion of the loop causes a phase difference between the counter-propagating light signals which may be used to measure gyroscope rotation. It is advantageous, because the phase shift induced in one rotation is relatively small and because periodic outputs relating to rotation are required, to recirculate input light within the loop as many times as possible.

In traversing a kilometer of optical fiber, an optical signal will typically lose 30 to 50 percent of its intensity. An amplifier, if capable of amplifying the bidirectional counter-propagating light signals, would permit a light signal to propagate many times within the loop, if the amplifier were placed in series with the loop, and provided a gain of 2 to 3 db.

Unfortunately, the relatively large size, high power requirements caused by relatively inefficient performance, beam wander effects, and cooling requirements of prior art ND:YAG rod amplifiers, as described above, makes such amplifiers relatively impractical for high accuracy gyroscopes. These factors, of course, also limit the utility of such amplifiers in other applications, such as communication networks.

SUMMARY OF THE INVENTION

These disadvantages associated with crystal rod amplifiers are alleviated in the present invention. This invention permits both the pumping source fiber and the doped amplifying medium to be small diameter optical fibers. These fibers are positioned together in close proximity within a jacket to form an optical coupler. The indices of refraction of the pump fiber, amplifier fiber, and jacket are selected so that the signal to be amplified, which traverses the doped fiber, is well guided, while the light used for pumping, which traverses the pump fiber, is not well guided within that fiber itself, but only within the overall coupler system. The coupler thus limits loss to the signal traversing the doped fiber since this signal is not coupled to the pumping fiber, while the pumping signal is intentionally poorly guided so that it will couple from the pumping fiber to the doped fiber.

In the preferred embodiment, this coupling characteristic is achieved by providing a doped fiber, such as ND:YAG, having a first refractive index, and a pumping fiber, such as quartz, having a second refractive index, in a side-by-side relationship within a coupler body surrounding both fibers and having a third refractive index. This coupler body is, in turn, surrounded by air or another suitable material having a fourth refractive index.

The first refractive index of the doped fiber, which carries the signal to be amplified, is higher than the third refractive index of the coupler body and thus the signal to be amplified is guided within the doped fiber. The second refractive index of the pumping quartz fiber is lower than the third refractive index of the coupler body, and thus the pumping illumination in the quartz fiber is not guided by the quartz fiber, but is allowed to refract into the coupler body. The third refractive index of the coupler body is greater than the fourth refractive index of the material or air surrounding the coupler body, so that the interface between these materials guides the pumping illumination for absorption by either (a) the coupler body, (b) the quartz pumping fiber, or (c) the doped fiber which forms an amplifier for the guided input signal. If the diameter of the jacket is only slightly larger than the fiber diameters, a significant portion of the pumping illumination refracted from the pumping fiber will be absorbed in the ND:YAG crystal fiber, resulting in a high energy density and thus a high inversion ratio within the ND:YAG crystal fiber to provide amplification of the optical signal which it transmits.

In order to make the amplifier of this invention bidirectional, that is, in order to introduce equal gain for signals traversing in opposite directions through the doped fiber, it is advantageous to illuminate (pump) the quartz pumping fiber at both ends, so that the inversion population will be distributed symmetrically along the length of this fiber. If the pump fiber is made sufficiently long, substantially all of the pump power supplied to the ends of the pump fiber will be absorbed within the cavity structure, and a substantial percentage of this power will be absorbed within the doped fiber within the coupler.

In an alternative embodiment, both the pumping fiber and the doped fiber may be in the form of clad fibers, and the cladding may be polished on one side of each of the fibers to form a planar outer cladding surface. If the planar surfaces are juxtaposed, to form the coupler body, the cladding of the fibers may form the third refractive index necessary for guiding the pump optical signal within the coupler body. As yet another alternative, uncladded fibers of quartz and ND:YAG may be polished to provide planar surfaces which, if juxtaposed, will provide the necessary coupling with surrounding air as the third refractive medium for guiding the pump power.

In yet another alternative arrangement, a plurality of amplifiers, in accordance with the present invention, may be arranged along the length of an ND:YAG fiber element so that relatively small light sources, such as light emitting diodes, may be used to provide a small gain to the amplified signal at each such amplifier, yielding the overall required gain through an additive effect. Even in this embodiment, it is desirable to place light emitting diodes at both ends of each of the pumping fibers so that uniform bidirectional amplification may be achieved.

BRIEF DESCRIPTION OF THE DRAWINGS

These and other advantages of the present invention are best understood through the following description, which references the drawings, in which:

FIG. 1 is a diagram showing the physical arrangement of the preferred embodiment of the fiber amplifier of the present invention;

FIG. 2 is a sectional view of the arrangement of FIG. 1 taken along lines 2—2 of FIG. 1;

FIG. 3 is a diagram showing the absorption spectrum of ND:YAG at 300° K.;

FIG. 6 is a sectional view similar to the view of FIG. 2 showing an alternate configuration for the amplifier; and FIG. 7 is a second alternate configuration, similar to FIG. 1, showing a series of optical amplifiers with low level light sources.

DETAILED DESCRIPTION OF THE PREFERRED EMBODIMENT

Figure 4:
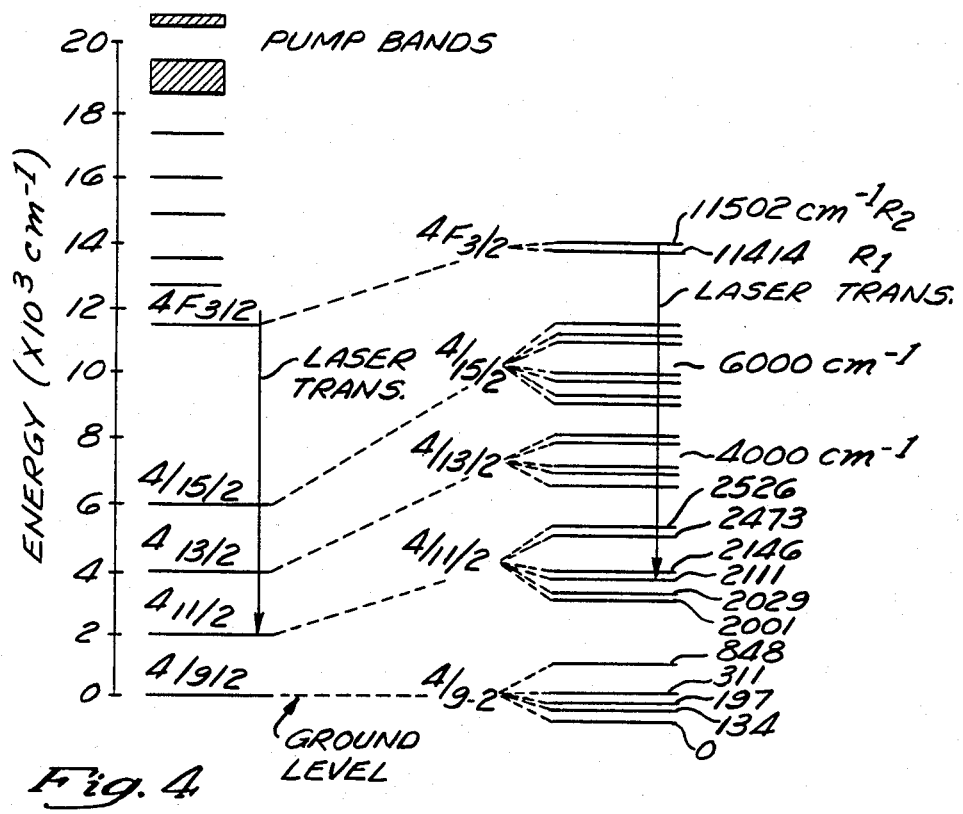
FIG. 4 is an energy level diagram of ND:YAG.

Referring initially to FIGS. 1 and 2, the preferred embodiment of this invention includes a pumping fiber 12 and a signal fiber 14. The pumping fiber 12 is typically a quartz fiber which, in an exemplary configuration, has a diameter of approximately 200 microns. This fiber 12 extends parallel to, and in close proximity with, the signal fiber 14 through a distance 16 of approximately 2 centimeters. The signal fiber 14 is a single crystal of ion doped material which will lase at the frequency to be amplified. In the diagram of FIG. 1, and for the description which follows, it will be assumed that the input light signal, which is to be amplified, is input to a first end 18 of the signal fiber 14 and is output, after amplification, from a second end 20 of the fiber 14. It should be recognized, however, that in many applications, such as communication and rotation sensing applications, signals will be input at both ends 18,20 of the fiber 14 and should be uniformly amplified regardless of the direction of propagation through the fiber 14.

The fiber 14, in this exemplary embodiment, has a diameter of 100 microns. Throughout the length 16 of the parallel extension of the fibers 12 and 14, these fibers are encapsulated within a jacket 22 which, as will be explained further below, provides a waveguide for the illumination used to pump the fiber 14. Both of these fibers 12,14 are unclad, except to the extent that the jacket 22 provides a cladding.

The fiber 14 is formed as a single crystal of ND:YAG material. A pair of light sources 24,26 are coupled to the opposite ends of the pump fiber 12 and may, for example, be laser sources which provide light energy, or pumping light, for inverting the neodymium ions within the ND:YAG crystal 14 to permit amplification.

Each of the fibers 12,14, as well as the jacket 22, are transparent to the wavelength of light from the pumping sources 24,26. It is preferable that the jacket 22 have as low a loss characteristic at this frequency as possible, whereas it is advantageous to have the absorption length of this frequency as short as possible in the ND:YAG fiber 14.

The indices of refraction of the fibers 12,14 and the jacket 22 are selected to permit the signal fiber 14 to guide the signal input at its end 18. However, the indices are also selected to allow light from the pumping sources 24,26 to enter the jacket 22 from the fiber 12 and to thereafter enter and be absorbed by the fiber 14. Thus, as is shown in the example of FIG. 2, the ND:YAG fiber 14 has a refractive index $N_1$ equal to 1.8. The quartz fiber 12, on the other hand, has an index of refraction $N_2$ of 1.5. The index of refraction of the jacket 22, $N_3$, is selected to be between 1.5 to 1.8, so that $N_1 > N_3 > N_2$. Finally, the refractive index surrounding the jacket 22, $N_4$, is less than the refractive index $N_3$ of the jacket 22. In the example shown in FIG. 2, the refractive index $N_4$ is formed by air, although it should be understood that a secondary cladding may surround the jacket 22 to eliminate losses which may otherwise occur at the interface between the jacket 22 and the surrounding air, due to surface irregularities, and resultant scattering, in the jacket 22.

From the above description, it will be understood that, because the refractive index $N_1$ of the fiber 14 is greater than the refractive index $N_3$ of the jacket 22, signals input at the end 18 of the fiber 14, which are to be amplified by the system, are well guided within the fiber 14. Because the refractive index $N_2$ of the quartz fiber 12 is less than the refractive index $N_3$ of the jacket 22, the pumping light from the sources 24,26 will not be guided by the fiber 12, but will be refracted into the jacket 22. However, this light, as shown by the exemplary rays 24 and 26 of FIG. 2, and 28 of FIG. 1, will be well guided by the jacket 22, since the index of refraction $N_3$ of the jacket 22 is greater than the index of refraction $N_4$ of the surrounding material. Thus, the pumping illumination will be guided within the confines of the jacket 22 for ultimate absorption by the fiber 14. As shown in FIG. 1, the pumping illumination, exemplified by the ray 28, will be absorbed by each of the fibers 12 and 14 and the surrounding jacket 22 in proportion to the path length through each of these elements and the absorption length at the pumping wavelength of each of these elements. For this reason, it will be understood that it is advantageous to maintain the envelope size of the jacket 22 as small as possible to minimize absorption by the jacket 22 and to thereby maximize absorption in the ND:YAG fiber 14.

Referring now to FIG. 3, which is a diagram of the absorption spectrum of ND:YAG crystal at 300° K., it can be seen that the ND:YAG material has a relatively high optical density, and thus a short absorption length, at selected wavelengths. For this reason, it is advisable to select the pumping illumination sources 24,26 (FIG. 1) to emit radiation at these frequencies in order to (a) maximize the absorption of the pumping illumination in the ND:YAG fiber 14 as opposed to the quartz fiber 12 and jacket 22, and (b) to permit the absorption length to be as short as possible and thus to allow the length 16 (FIG. 1) of the absorption region to be as short as possible while still permitting substantially complete absorption of the pumping illumination within the amplifier structure. As can be seen from FIG. 3, the wavelength 0.58 microns is best suited for the illumination sources 24,26 in this exemplary embodiment, although the wavelengths 0.75 to 0.81 microns are relatively well suited.

Figure 5A:
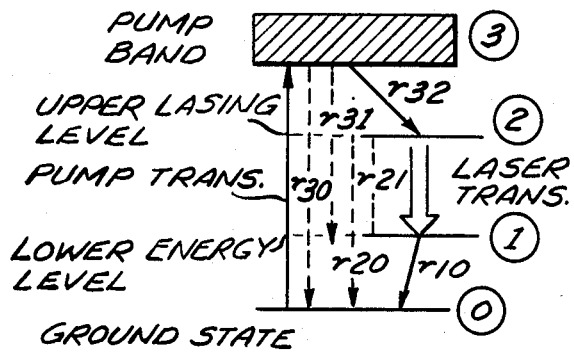
FIG. 5 is a simplified energy level diagram of a four-level laser using a doped material, such as ND:YAG.
Figure 5B:
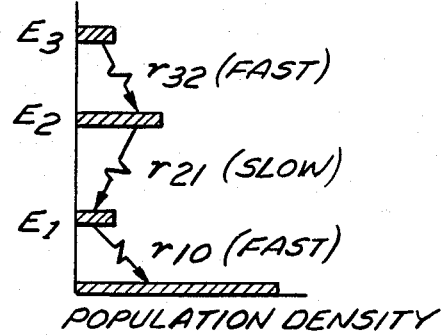

Referring now to FIG. 5A, which is an energy level diagram for the ND:YAG crystal, it will be understood that, when pump light at the absorption wavelength, described above, is absorbed by the ND:YAG crystal, the neodymium ions are excited from the ground state to the pump band. From the pump band, the ions quickly relax, through phonon interactions, to the upper lasing level. From this upper lasing level, the neodymium ions will undergo a relatively slow fluorescence to the lower energy level. From this latter level, a final, rapid phonon relaxation occurs to the ground state. This latter rapid relaxation in a four-level laser system of the type shown in FIG. 5A is advantageous, since the rapid phonon relaxation between the lower energy level and the ground state provides a practically empty lower energy level. This feature is shown in FIG. 5B, in which the population densities at the pump band, upper lasing level, lower energy level, and ground state are shown for an ND:YAG fiber during continuous pumping. Because the rate of fluorescence between the upper lasing level and lower energy level is relatively slow in comparison with the phonon relaxation between the pump band and the upper lasing level, as well as between the lower energy level and the ground state, the population density at the upper lasing level is substantially higher than that at the lower energy level, yielding a high inversion ratio. The average lifetime of neodymium ions at the upper lasing level, prior to spontaneous fluorescence, is 230 microseconds.

FIG. 4 illustrates, in greater detail, the multiple energy states of ND:YAG material, as well as the laser transition for this material.

An input light signal at the laser transition wavelength (1.064 microns), i.e., the wavelength of light emitted by the ND:YAG ions during relaxation between the upper lasing level and the lower energy level, traveling through the excited laser fiber 14 (FIG. 1) will trigger the emission of stimulated photons at the same frequency, coherent with the signal, and the signal is thereby amplified. Thus, the passage of light at this frequency will cause a photon emitting relaxation between the upper lasing level and lower energy level of FIG. 5A, in phase with the light signal to be amplified, yielding an effective gain for the input light signal.

The gain which can be achieved in the amplifier of this invention is dependent upon the density of the inverted neodymium ion population within the ND:YAG crystal. Initially, the ultimate inversion population is limited by the lattice structure of the YAG material itself. Since the ND:YAG material replaces ytrium atoms with neodymium atoms in the crystal lattice. Only approximately one ytrium atom in each one-hundred ytrium atoms may be replaced by a neodymium ion without distorting the lattice structure of the ND:YAG material.

Theoretical calculations of the small gain signal $g_0$ of the amplifier of this invention can be made, using the relation $g_0 = \sigma \Delta N$, where $\sigma$ is the stimulated emission cross-section, for ND:YAG, $8.8 \times 10_{19}$ cm$^2$, and $\Delta N$ is the population inversion density given by:

$$\Delta N = \frac{P_p}{V} \frac{\eta_1 \eta_2 t_{sp}}{h\nu} \quad (1)$$

where $P_p$ is the absorbed pump power, V is the crystal volume and thus, $P_p/V$ is the absorbed pump power per unit of fiber volume, $t_{sp}$ is the spontaneous radiative lifetime, that is, the 230 microsecond fluorescence relaxation time of the neodymium ions, $\eta_1$ is the effective spectral overlap of pump output with an ND:YAG absorption line, as shown in FIG. 3, $\eta_2$ is equal to the quantum efficiency of 1.06 micron fluorescence, namely 0.63, and $h\nu$ is equal to the energy of one pump photon.

Combining the above relationship provides:

$$g_0 = \sigma \frac{P_p}{V} \frac{\eta_1 \eta_2 t_{sp}}{h\nu} \qquad (2)$$

for the dependence of gain on pump power. It should be recognized that the value $P_p$ is the absorbed pump power and that an increase in the length of the fibers does not necessarily increase the gain. Thus, if the length of the fibers is sufficient so that the pumping radiation passes through the ND:YAG fiber a distance which is sufficient to permit this fiber to completely absorb the pumping radiation, then the value $P_p$ in this equation may be replaced by the input power level. For a typical value of $\eta_1 = 0.5$, we find that $g_0$ is equal to 0.01 db for $P_p$ equal to 1 milliwatt in a single crystal fiber 14, having a 120 micron diameter. To obtain the net gain, however, one must subtract from $g_0$ the fiber propagation losses at 1.06 microns. A fiber loss of 100 db per kilometer would reduce the gain by only 0.001 db per centimeter. Thus, if the overall length of the amplifier can be maintained relatively short, as by maintaining a high angle of incidence for the ray 28 within the amplifier (FIG. 1), while still absorbing substantially all of the input pump power, the propagation losses within the amplifier can be maintained at a low level.

The pump power density may be maintained at a relatively high level with presently available light emitting diodes. In fact, long life LEDs are available which, operating at a current density of approximately 1,000 amps per cm$^2$, have radiance of approximately 5 watts/sr.cm$^2$ and LEDs have been reported with a radiance of approximately 50 watts/sr.cm$^2$. The former would be capable of coupling approximately 1 milliwatt of power into a YAG fiber of 100-micron diameter and the latter would be capable of coupling approximately 10 milliwatts into the same fiber. This relatively large power is possible because of the large refractive index of YAG leading to an acceptance half-angle of 57 degrees (or a 2.8 sr). With these values of pump power, the gain becomes 0.01 to 0.1 db per centimeter of length of fiber 14. The above results apply to YAG fiber operated in air. If the fiber were glass cladded (N approximately equal to 1.5), the acceptance angle would become approximately 1 sr and the above values of pump power and signal gain would be reduced by a factor of 2.8.

With laser diodes, it is possible to concentrate larger values of pump power into fiber 14. In any event, one can consider injecting a pump signal having approximately 30 milliwatts of average power into a fiber, which corresponds to a signal gain of 0.3 db in a fiber of 120-micron diameter, and 1.7 db in a fiber of 50-micron diameter.

As is apparent from the previous description, and referring again to FIG. 1, it is necessary, in order to properly pump the ND:YAG fiber 14, that the pump sources 24,26 be either continuously operated, or operated immediately before application of an input signal to the fiber 14, that is, well within the 230-microsecond fluorescence relaxation time of the neodymium ions. Because the wavelengths from the pump sources 24 and 26 are absorbed within the ND:YAG fiber 14 in a short absorption distance, it is possible to continuously operate the pump sources 24,26 without interfering with the signal propagation through the fiber 14 and without concern that the pumping illumination will itself propagate through the fiber 14.

Referring again to FIG. 1, it should be noted that the ND:YAG fiber 14, in the area adjacent the end 18,20 but outside of the jacket 22, will guide the signal before and after amplification, since the index of refraction $N_1$ is higher than that of the surrounding air. It may be advantageous, of course, to clad the ND:YAG fiber 14 in these regions to reduce surface losses.

Similarly, the quartz fiber 12, in the region beyond the jacket 22, will guide the light from the pump sources 24,26, since its index, $N_2$, is higher than that of the surrounding air. It is possible, of course, to also clad the quartz fiber 12 in this region to reduce surface losses, so long as the index of the cladding used in the region beyond the ends of the jacket 22 is lower than that of the quartz.

It will be recognized that the pumping light from the source 24 will tend to be initially absorbed adjacent the end 18 within the amplifier system, and thus the length of the fiber 14 may not be uniformly illuminated by the source 24. Thus, the inverted population of neodymium ions may not be uniformly distributed along the length 16. Because this non-uniform or non-symmetrical state within the amplifier will yield different gain for signals input at the end 18 than for signals input at the end 20 (particularly when these signals occur simultaneously), it has been found advantageous to pump the quartz fiber 12 at both ends simultaneously with the pump sources 24,26, to assure that the inverted neodymium ion population will by symmetrical along the length 16 and will thus amplify signals from either end 18,20 uniformly.

The phenomenon of dissimilar gain for signals traversing the fiber 14 in different directions with a non-symmetrical inversion population of neodymium ions occurs as follows. It will be recognized that, as a signal to be amplified propagates from the end 18 of the fiber 14, it will trigger the emission of stimulated photons within the ND:YAG fiber as it traverses the length 16. Such triggered emission, of course, lowers the inversion population within the fiber 14. If, for example, in a gyroscope, a pair of waves propagate simultaneously through the fiber 14 in opposite directions from the ends 18 and 20, the signal input at the end 18 will deplete the inversion population adjacent the end 18 before the signal input at the end 20 arrives at the left end of the fiber 14, as viewed in FIG. 1. If the inversion population is higher at the left end of the fiber 14, than at the right end, the signal input at the end 18 will undergo a greater amplification, since it will deplete the inversion population before the signal which is input at the end 20 arrives at the high density left end.

It should also be recognized that the pumping illumination supplied from the pump sources 24,26 to the ND:YAG fiber 14 should be sufficient, on a continuing basis, to replace the depleted population within the fiber 14 which occurs when the signals are amplified. Thus, for example, in a gyroscope where a pulse signal circulates through a kilometer of fiber, the counter-propagating signals will traverse the amplifier, shown in FIG. 1, approximately once each five microseconds. If continuous pump sources 24,26 are used, they should provide sufficient output so that, during each five-microsecond period, they are capable of reinverting the neodymium ion population which has relaxed during each successive traverse of the signals, to reinvert a population equal to that which has relaxed, such that the amplification factor or gain of the amplifier will remain relatively constant.

FIG. 6 shows an alternate cross-sectional view, similar to FIG. 2, of a structure which does not utilize the jacket 22 of FIG. 2, but relies upon the differential between the index of refraction of the ND:YAG fiber 14 and the quartz fiber 12, on the one hand, and that of the surrounding air, on the other hand, to guide the pump light and signal light within the system. In this embodiment, both the fiber 14 and the fiber 12 are polished along one surface to provide planar outer surfaces 34 and 36 which are abutted throughout the length of desired interaction, such as the length 16 of FIG. 1.

With the arrangement shown in FIG. 6, the index of refraction of the ND:YAG fiber 14 should be higher than the index of refraction of the quartz fiber 12 so that the signal to be amplified will be well guided within the fiber 14 by both the fiber-air interface and the fiber-fiber interface. On the other hand, the pump signal within the quartz fiber 12 will be guided throughout that portion of its circumference which interfaces with the surrounding medium, but will be unguided at the surface 32 and will thus propagate into the ND:YAG fiber 14 to pump the neodymium ions in that fiber 14. It will also be recognized, of course, that the embodiment shown in FIG. 6 may be provided within a surrounding jacket, such as the jacket 22 of FIG. 2, where the jacket has a lower index of refraction than either the quartz fiber 12 or the ND:YAG fiber 14. This surrounding jacket will not alter the basic operation of the device, but will eliminate surface scattering caused by surface irregularities and thus assist in keeping the pump and signal light within the confines of the fibers 12 and 14.

In order to provide enough illumination, in the embodiment of FIG. 1, from the sources 24 and 26 to maintain a high inversion population within the fiber 14, the pump sources 24 and 26 may have to be laser sources. The embodiment shown in FIG. 7 permits the application of a plurality of lower level sources, such as light-emitting diode sources, to a series of amplifiers, each amplifier providing a small degree of gain to a propagating signal, with the overall gain being equal to that which may be provided by the amplifier of FIG. 1, but with the lower cost and power requirements of light-emitting diodes.

As shown in FIG. 7, plural quartz fibers 12a through 12e may be arranged in a manner similar to that shown in FIG. 1, with jackets 22a through 22e surrounding both the quartz fibers 12a–e and the single elongate ND:YAG fiber 14. With this arrangement, light emitting diodes 38a–e and 39a–e may be coupled to opposite ends of each of the quartz fibers 12a through 12e, respectively, to provide pumping sources for the series of low gain amplifiers.

With either the arrangement of FIG. 1 or FIG. 7, the jacket 22 forms a high q cavity which allows a single pump ray to make approximately 100 reflective passes through the ND:YAG fiber 14 in a length of approximately 2 centimeters. Thus, although the path of the single ray laterally through the ND:YAG fiber 14 is substantially shorter than an absorption length in that material, the plural passes permit the absorption of a substantial percentage of the pump source illumination within the ND:YAG fiber 14.

It should also be recognized that the structure shown in FIG. 1 will provide an oscillator or source for illumination at the lasing frequency of the ND:YAG fiber if the ends 18 and 20 are properly mirrored. Thus, by placing a mirror on the end 18 of the fiber 14 which reflects nearly 100% of illumination at the lasting frequency and by placing a second mirror on the end 20 of the fiber 14 which reflects a lower percentage of illumination at the same frequency, the structure shown in FIG. 1 may be used as a fiber laser source, with coherent light waves reflected back and forth through the length 16 within the fiber 14, and being emitted through the partially reflective mirror at the end 20, as coherent wave fronts of light at the lasing frequency for the fiber.

When the structure, shown in FIG. 1, is used as an illumination source, the pumping sources 24,26 may provide steadystate light output at the pumping wavelength, in which case a steadystate continuous light output will be provided by the fiber source. If, on the other hand, the pumping light from the light sources 24,26 is modulated output may be produced within the structure of FIG. 1.

As will be recognized from the above description, a proper selection of materials to provide indices of refraction which will guide the signal to be amplified within the signal fiber 14, but guide the pumping light only within the overall envelope 22 of the amplifier system, yields a small, relatively high gain amplifier system in which plural reflections within an overall cavity structure permit side pumping of the ND:YAG fiber 14, even though the diameter of this fiber 14 is substantially less than the absorption length of the ND:YAG material at the pumping wavelength.

What is claimed is:

1. A fiber optic device for producing coherent light, comprising:
   a first fiber having a first refractive index;
   a second fiber, formed of material which will lase, having a second refractive index higher than said first refractive index;
   means for introducing light into said first fiber for pumping said material of said second fiber, the wavelength of said light for pumping selected to cause a population inversion in said material which will lase; and
   an intermediate transfer material for allowing the transfer of light from said first fiber to said second fiber while preventing transfer of light from said second fiber to said first fiber, said transfer material having an index of refraction which is less than said second fiber, but which is not less than said first fiber.

2. A fiber optic device, as defined in claim 1, additionally comprising:
   means for introducing a light signal to be amplified into said second fiber, said signal stimulating light emission from said material which will lase which is coherent with said light signal to be amplified.

3. A fiber optic device, as defined in claim 2, in which said signal to be amplified has a frequency equal to a lasing frequency of said material which will lase.

4. A fiber optic device, as defined in claim 3, in which said refractive index of said second fiber and said refractive index of said transfer material cause said signal to be amplified to be guided within said second fiber.

5. A fiber optic device, as defined in claim 4, wherein said refractive index of said first fiber and said refractive index of said transfer material are selected to prohibit said light introduced into said first fiber from being guided within said first fiber.

6. A fiber optic device, as defined in claim 1, wherein said intermediate transfer material comprises:
   a transparent jacket surrounding said first and second fibers to form an interaction region.

7. A fiber optic device, as defined in claim 6, wherein said jacket is surrounded by material having a refractive index which is lower than the refractive index of said jacket.

8. A fiber optic device, as defined in claim 7, additionally comprising:
   means for introducing a signal to be amplified into said second fiber.

9. A fiber optic device, as defined in claim 1, wherein said second fiber is formed of ND:YAG material.

10. A fiber optic device, as defined in claim 1, wherein said means for introducing light into said first fiber introduces light having a wavelength which corresponds with an absorption spectrum peak of said material of said second fiber which will lase.

11. A fiber optic device, as defined in claim 1, additionally comprising:
   means for introducing a light signal to be amplified into said second fiber; and
   wherein said means for introducing light into said first fiber introduces said light prior to the introduction of said light signal to be amplified into said second fiber, but well within the spontaneous relaxation fluorescence time of said material which will lase.

12. A fiber optic device, as defined in claim 11, wherein said means for introducing light into said first fiber comprises light source means, coupled to said first fiber to introduce light in both directions along said first fiber, for symmetrically pumping said material which will lase.

13. A fiber optic device, as defined in claim 11, wherein said means for introducing light into said first fiber introduces sufficient light to restore ions within said material of said second fiber which will lase which are depleted during amplification of said light signal to be amplified.

14. A fiber optic amplifier, comprising:
   first and second optical fibers positioned in close relative proximity at an interaction region;
   a transparent jacket having an index of refraction N3 and surrounding said first and second optical fibers at said interaction region;
   said first optical fiber formed of material which will lase, having an index of refraction N1, and transmitting a signal to be amplified;
   said second optical fiber having an index of refraction N2, and transmitting light for pumping said material which will lase; and
   said indexes of refraction related by: N2<N3<N1 (a) to enable said first fiber to guide said signal to be amplified at said interaction region, but (b) to prohibit said second fiber from guiding said light for pumping at said interaction region.

15. A fiber optic amplifier, as defined in claim 14, in which said transparent jacket is surrounded by a medium having an index of refraction N4 which is less than said index of refraction N3 so that said jacket guides said light for pumping at said interaction region.

16. A fiber optic amplifier, as defined in claim 15, wherein said light for pumping is at a frequency at which the absorption spectrum of said material which will lase is high.

17. A fiber optic amplifier, as defined in claim 14, additionally comprising:
   means for introducing pumping illumination into said second fiber.

18. A fiber optic amplifier, as defined in claim 17, wherein said means for introducing illumination introduces pumping illumination at both ends of said second optical fiber.

19. A fiber optic amplifier, as defined in claim 18, wherein said means for introducing illumination comprises laser diodes.

20. A fiber optic amplifier, as defined in claim 18, wherein said means for introducing illumination comprises light emitting diodes.

21. A fiber optic amplifier, as defined in claim 14, wherein the length of said interaction region and the incidence angle of said light for pumping are selected to permit said light for pumping to be repeatedly transmitted through said first optical fiber a sufficient number of times so that the total path through said first optical fiber exceeds the absorption length of said first optical fiber.

22. A method of pumping a doped optical lasing fiber, comprising:
   positioning said fiber in side-by-side relationship with a pumping fiber at an interaction region;
   providing a transparent jacket which surrounds said lasing fiber and said pumping fiber at said interaction region;
   providing pumping illumination in said pumping fiber; and
   selecting the indices of refraction of said fibers and said jacket (a) to cause said lasing fiber to guide light produced when said doped optical lasing fiber lases but (b) to prohibit said pumping fiber from guiding said pumping illumination at said interaction region so that said pumping illumination is coupled to said lasing fiber at said interaction region.

23. A method of pumping a doped optical lasing fiber, as defined in claim 22, additionally comprising:
   introducing a signal to be amplified into said doped optical lasing fiber to stimulate coherent lasing of said doped optical lasing fiber.

24. A method of pumping a doped optical lasing fiber, as defined by claim 22, wherein said step of providing pumping illumination comprises providing illumination at a frequency which exhibits a high absorption level in the absorption spectrum of said optical lasing fiber.

25. Apparatus for generating coherent light in an optical fiber, comprising:
   a first fiber formed of material which will lase, having a first refractive index;
   a second fiber, having a second refractive index, said fibers having respective two-dimensional mating surfaces which are juxtaposed with each other in abutting relationship along a selected length of said fibers to form an interaction region; and
   a source of pumping illumination coupled to said second fiber, said second refractive index of said second fiber lower than said first refractive index of said first fiber to cause said pumping illumination to transfer from said second fiber through said surfaces and into said first fiber at said selected length of said fibers to cause inversion of said material which will lase.

26. Apparatus for generating coherent light, as defined in claim 25, wherein the wavelength of said pumping illumination is near a peak of the absorption spectrum of said first fiber to cause absorption of a major portion of said pumping illumination in said first fiber at said interaction region.

27. Apparatus for generating coherent light, as defined in claim 25, additionally comprising:
 means for coupling an optical signal to be amplified to said first fiber, said optical signal to be amplified triggering the emission of coherent light from said material which will lase.

28. A methd of generating coherent light, comprising:
 providing a first fiber, formed of a material which will lase, having a first refractive index, said first fiber having a two-dimensional mating surface;
 providing a second fiber having a second refractive index, said second fiber having a two-dimensional mating surface;
 juxtaposing the mating surfaces of said fibers to form an interaction region;
 coupling a source of pumping illumination to said second fiber; and
 selecting said indices of refraction of said fibers so that said second index is lower than said first index to cause said pumping illumination to transfer from said second fiber to said first fiber for absorption by said first fiber.

29. A method of generating coherent light, as defined in claim 28, additionally comprising:
 selecting said source of pumping illumination to provide a principal optical wavelength $\lambda$ which coincides with a peak in the absorption spectrum of said material which will lase.

30. A method of generating coherent light, as defined in claim 28, additionally comprising:
 coupling an optical signal having a wavelength equal to the lasing wavelength of said material which will lase to said fiber; and
 triggering the emission of light in said fiber coherent with said optical signal.

* * * * *